United States Patent [19]

Shiga et al.

[11] 4,364,851
[45] Dec. 21, 1982

[54] PROCESS FOR PRODUCING OLEFIN POLYMERS

[75] Inventors: Akinobu Shiga; Yoshiharu Fukui; Toshio Sasaki; Masahisa Okawa; Hideaki Matsu-Ura, all of Niihama; Yasuharu Yamada, Osaka, all of Japan

[73] Assignee: Sumitomo Chemical Company, Limited, Osaka, Japan

[21] Appl. No.: 113,668

[22] Filed: Jan. 21, 1980

[30] Foreign Application Priority Data

Jan. 31, 1979 [JP] Japan ........................ 54-10555

[51] Int. Cl.³ .............................................. C08F 4/64
[52] U.S. Cl. ............................... 252/429 B; 526/125; 526/128
[58] Field of Search ........................... 252/429 B

[56] References Cited

U.S. PATENT DOCUMENTS

| | | | |
|---|---|---|---|
| 3,769,233 | 10/1973 | Hermans et al. | 252/429 B X |
| 4,093,789 | 6/1978 | Kuroda et al. | 252/429 B X |
| 4,115,319 | 9/1978 | Scata et al. | 252/429 B |
| 4,159,256 | 6/1979 | Sakurai et al. | 252/429 B |
| 4,186,107 | 1/1980 | Wagner | 252/429 B |
| 4,223,117 | 9/1980 | Sano et al. | 252/429 B X |
| 4,235,984 | 11/1980 | Sniga et al. | 252/429 B X |
| 4,252,670 | 2/1981 | Caunt et al. | 252/429 B |

FOREIGN PATENT DOCUMENTS 53-44495 4/1978 Japan .
52-91795 8/1978 Japan .

*Primary Examiner*—Patrick Garvin
*Attorney, Agent, or Firm*—Stevens, Davis, Miller & Mosher

[57] ABSTRACT

A process for producing an olefin polymer by polymerizing an olefin with a catalyst system comprising an organoaluminum compound and a supported catalyst component prepared by using as the carrier a solid product obtained by the reaction of an organomagnesium compound with an aluminum halide compound and/or a silicon halide compound, by heating a liquid ether complex of titanium trichloride in the presence of said carrier, and further reacting the resulting titanium trichloride-containing solid product with titanium tetrachloride. By this process, the olefin polymer having a broad molecular weight distribution suitable for flow molding or extrusion molding is produced.

12 Claims, No Drawings

PROCESS FOR PRODUCING OLEFIN POLYMERS

This invention relates to a method for preparing a novel catalyst component having a high activity and uniform particle size distribution and a process for producing an olefin polymer of broad molecular weight distribution suitable for blow molding, extrusion molding and the like using said catalyst component.

Conventionally, as is well known, for olefin polymerization use has been made of a so-called Ziegler-Natta catalyst comprising a compound of a transition metal of groups IVb to VIb as a catalyst component and a metal or an organometallic compound of a metal of Groups I to III of the Periodic Table as an activating component.

In recent years, developments of highly active catalyst components have been widely done in order to simplify the production steps by omitting the step of removing the catalyst residues from the polymer which was formed and thus to curtail the production cost. A large number of researches were directed especially to the supported catalyst components comprising transition metal compounds supported on various carriers for the purpose of increasing the catalytic activity per unit quantity of the transition metals. Thus, it was found that inorganic compounds such as oxides, hydroxides, chlorides, carbonates of metals and silicon, mixtures and double salts thereof were effective carriers.

It is well known that particularly a catalyst component obtained by supporting titanium tetra- or tri-chloride on a magnesium compound, used as a carrier, exhibits a high activity in the polymerization of olefins.

The olefin polymers obtained by using the above catalyst component have generally a narrow molecular weight distribution and, for this reason, the olefin polymers have disadvantages in use in the fields of extrusion molding and blow molding. Therefore, various attempts were conducted on the methods for producing olefin polymers having a broad molecular weight distribution. For example, U.S. Pat. No. 4,093,789 disclosed, as a supported catalyst component, titanium trichloride and titanium tetrachloride supported on magnesium chloride by copulverization of the ingredients. The catalyst component obtained by this method, however, has disadvantages in that when olefin polymerization is carried out by use of this catalyst component, the polymerization activity per unit quantity of the catalyst component is still insufficient and the polymer has generally a broad particle size distribution and a low bulk density.

In another known method, titanium tetrachloride supported on a magnesium chloride carrier is reduced with an organoaluminum compound and then further reacted with titanium tetrachloride (Japanese Patent Application Laid-open No. 44,495/1978). In this case, however, the molecular weight distribution of the produced olefin polymer is not satisfactorily broad, as shown in Comparative Example to be described herein later.

It is, therefore, advantageous for the commercial production of olefin polymers for use in the field of extrusion molding or blow molding to develop a catalyst which meets simultaneoulsy the following requirements; (1) the catalyst has a catalytic activity high enough to omit the step of removing the catalyst residues, (2) the solid catalyst component has a narrow particle size distribution and a high bulk density, (3) when the catalyst is used in the polymerization, a polymer of broad molecular weight distribution is produced.

From the above viewpoint, the present inventors conducted extensive studies on the commercially advantageous process for producing olefin polymers and, as a result, found that a novel olefin polymerization catalyst component having a high activity and a narrow particle size distribution and capable of a polymer of broad molecular weight distribution is obtained by using as the carrier a solid product formed by reacting an organomagnesium compound with an aluminum halide compound and/or a silicon halide compound, heating an ether complex of titanium trichloride in the presence of said carrier at a temperature of up to 150° C., to deposit titanium trichloride on the carrier, allowing the resulting titanium trichloride-containing solid product to react with titanium tetrachloride, and combining the resulting supported catalyst component (referred to as "solid catalyst component" hereinafter) with an organoaluminum compound as an activating component. Based on this finding, the present invention has been accomplished.

An object of this invention is to provide a novel solid catalyst component having a high activity and uniform particle size distribution and capable of yielding an olefin polymer having a broad molecular weight distribution suitable for blow molding, extrusion molding and the like and also to provide a method for preparing the same.

Another object of this invention is to provide a process for producing an olefin polymer of broad molecular weight distribution suitable for blow molding, extrusion molding and the like.

Other objects and advantages of this invention will become apparent from the following description.

According to this invention, there are provided (A) a method for preparing a solid catalyst component, which comprises using as the carrier a solid product obtained by the reaction of an organomagnesium compound with an aluminum halide compound represented by the general formula $R_nAlX_{3-n}$ (wherein R represents an alkyl group, an aryl group, or an alkenyl group each having up to 8 carbon atoms, X represents a halogen atom, and n is a number defined by $0 \leq n < 3$) and/or a silicon halide compound represented by the general formula $R^1_mSiX_{4-m}$ (wherein $R^1$ represents an alkyl group, an aryl group or an alkenyl group each having up to 8 carbon atoms, X represents a halogen atom, and m is a number defined by $0 \leq m < 4$), heating a liquid ether complex of titanium trichloride in the presence of said carrier at a temperature of 150° C. or lower to deposit titanium trichloride on the carrier, and further reacting the resulting titanium trichloride-containing solid product with titanium tetrachloride; and (B) a process for producing an olefin polymer, which comprises using a catalyst comprising said solid catalyst component and an organoaluminum compound as an activating compound represented by the general formula $R^2_pY_qAl(OR^3)_r$ (wherein $R^2$ and $R^3$ each represents a linear alkyl group, a branched chain alkyl group, an alicyclic hydrocarbon group or an aromatic hydrocarbon group each having up to 8 carbon atoms, Y is a halogen or hydrogen, and p, q and r are numbers satisfying the following equations; $0 \leq p \leq 3$, $0 \leq q < 2$, $0 \leq r < 3$, and $p + q + r = 3$).

The characteristic features of this invention are such that (1) the activity of the catalyst is so high that the step of removing catalyst residues subsequent to polymerization can be omitted, (2) the particle size distribution of the solid catalyst component is narrow and a polymer having a high bulk density is obtained, (3) by using the catalyst, it is possible to prepare a polymer having a broad molecular weight distribution suitable for blow molding and extrusion molding, and (4) the molecular weight distribution of the polymer can be varied by suitably selecting the amount of titanium trichloride supported on a solid carrier and the type of organoaluminum compound which is used in polymerization as an activating component.

The organomagnesium compound used in preparing the carrier can be any type of those formed conventionally by the reaction of alkyl halides with metallic magnesium. Especially preferred are Grignard compounds represented by the general formula $R^6MgX$ (wherein $R^6$ is an alkyl group, an aryl group, an aralkyl group or an alkenyl group each having up to 8 carbon atoms and X is a halogen atom) and/or organomagnesium compounds represented by the general formula $R^6_2Mg$ (where $R^6$ is as defined above). Examples of particular Grignard compounds include ethylmagnesium chloride, n-propylmagnesium chloride, n-butylmagnesium chloride, tert-butylmagnesium chloride, phenylmagnesium chloride, ethylmagnesium iodide, and n-butylmagnesium iodide. Examples of individual organomagnesium compounds represented by the general formula $R^6_2Mg$, are diethylmagnesium, dipropylmagnesium, dibutylmagnesium, dihexylmagnesium, dioctylmagnesium, diphenylmagnesium, and dibenzylmagnesium.

These organomagnesium compounds are prepared and used in the presence of ether solvents such as diethyl ether, di-n-propyl ether, di-isopropyl ether, di-n-butyl ether, di-n-amyl ether and di-isoamyl ether or hydrocarbon solvents such as hexane, heptane, octane, cyclohexane, benzene, toluene, and xylene.

The aluminum halide compounds used in this invention are those represented by the general formula $R_nAlX_{3-n}$ (wherein R is an alkyl group, an aryl group, an aralkyl group or an alkenyl group each having up to 8 carbon atoms, X is a halogen atom, and n is a number defined by $0 \leq n < 3$) and those having in the molecule an aluminum-to-halogen bond (Al—X), particularly aluminum halides, alkylaluminum dihalides, dialkylaluminum halides and alkylaluminum sesquihalides are preferred. Exemplified compounds are anhydrous aluminum chloride, anhydrous aluminum bromide, anhydrous aluminum iodide, methylaluminum dichloride, ethylaluminum dichloride, n-propylaluminum dichloride, dimethylaluminum chloride, diethylaluminum chloride, di-n-propylaluminum chloride, methylaluminum sesquichloride, and ethylaluminum sesquichloride. Of these, most preferred are anhydrous aluminum chloride, ethylaluminum dichloride, diethylaluminum chloride and ethylaluminum sesquichloride.

The silicon halide compounds represented by the general formula $R^1_mSiX_{4-m}$ (wherein $R^1$ is an alkyl group, an aryl group, an aralkyl group or an alkenyl group each having up to 8 carbon atoms, X is a halogen atom, and m is a number defined by $0 \leq m < 4$) are compounds having in the molecule a silicon-to-halogen bond (Si—X) and better results are obtained with the compound having more halogen atoms. Examples of individual compounds include silicon tetrachloride, silicon tetrabromide, methylsilyl trichloride, dimethylsilyl dichloride, trimethylsilyl chloride, ethylsilyl trichloride, diethylsilyl dichloride, triethylsilyl chloride, propylsilyl tribromide, butylsilyl trichloride, tributylsilyl chloride, and vinylsilyl trichloride. Silicon tetrachloride is particularly preferred in view of the particle size distribution and bulk density of the solid catalyst component.

The preparation of the carrier is carried out entirely under an atmosphere of inert gases such as nitrogen and argon. The reaction of an organomagnesium compound with an aluminum halide compound and/or a silicon halide compound is carried out in a solvent at a temperature preferably in the range of 0° to 50° C., though heating up to about 100° C. is tolerable. The solvents used in this reaction include aliphatic hydrocarbons such as pentane, hexane, heptane and octane, aromatic hydrocarbons such as benzene, toluene and xylene, alicyclic hydrocarbons such as cyclohexane and cyclopentane, and ether solvents such as diethyl ether, di-n-butyl ether, and di-isoamyl ether, di-n-amyl ether, tetrahydrofuran and dioxane. It is particularly preferable to carry out the reaction in di-n-butyl ether as solvent.

The molar ratio of the organomagnesium compound to the aluminum halide compound and/or silicon halide compound used in the reaction is 0.1–10.0, preferably 0.5–2.0.

The solid reaction product obtained as above is isolated, for example, by allowing the reaction mixture to stand and removing the supernatant. It is preferable to use the residue as carrier after having been thoroughly washed with a hydrocarbon solvent and dried.

The preparative procedure for the liquid ether complex of titanium trichloride used in this invention is described below.

The ether compounds used in preparing the complex are those represented by the general formula $R^4OR^5$ (wherein $R^4$ and $R^5$, which may be the same or different, each represents an alkyl group, an aralkyl group or an alkenyl group each having up to 10 carbon atoms). Preferred ether compounds are those having alkyl groups ($R^4$ and $R^5$) of 2 to 5 carbon atoms. Examples are diethyl ether, di-n-propyl ether, di-n-butyl ether, di-n-amyl ether, diisoamyl ether, n-amyl n-butyl ether, n-amyl isobutyl ether, n-amyl ethyl ether, n-butyl ethyl ether, n-butyl isoamyl ether, and n-butyl n-propyl ether. Of these, di-n-butyl ether is particularly preferred.

The liquid ether complex of titanium trichloride may be prepared, for example, by (I) reduction of titanium tetrachloride with an organoaluminum compound in the presence of an ether compound and (II) conversion of solid titanium trichloride into a soluble ether complex by contacting with an ether compound in a hydrocarbon solvent. The procedure (I) is described below in detail.

The organoaluminum compounds used in reducing titanium tetrachloride are those represented by the general formula $R^{10}_kAlY_{3-k}$ (wherein $R^{10}$ is a linear alkyl group, a branched chain alkyl group, an alicyclic hydrocarbon group, or an aromatic hydrocarbon group each having up to 8 carbon atoms, Y is a halogen or hydrogen, and k is a number defined by $1 \leq k \leq 3$). Particularly preferred are diethylaluminum chloride, ethylaluminum dichloride, ethylaluminum sesquichloride, triethylaluminum and diethylaluminum hydride.

The amount of an organoaluminum compound to be used as a reducing agent is 0.1 to 1.1 moles per 1 mole of titanium tetrachloride. An optimum amount is that necessary for the conversion of substantially all of the titanium tetrachloride to titanium trichloride and the conversion of substantially all of the organoaluminum compound to aluminum chloride. That is, the reactants are used in substantially stoichiometrical amounts. For example, the theoretical amount is 0.5 mole for diethlaluminum chloride and 0.33 mole for triethylaluminum.

The amount of an ether compound to be used is 0.1 to 3, preferably 0.5 to 1.5 mole per 1 mole of titanium tetrachloride.

The reduction of titanium tetrachloride with an organoaluminum compound in the presence of an ether compound can be effected in various ways, as exemplified by the following procedures:

(1) An organoaluminum compound diluted with a hydrocarbon solvent is added to a mixed solution of titanium tetrachloride and an ether compound diluted with a hydrocarbon solvent; or, conversely, said mixed solution of titanium tetrachloride and ether compound is added to said organoaluminum compound.

(2) A mixed solution of an ether compound and an organoaluminum compound diluted with a hydrocarbon solvent is added to titanium tetrachloride diluted with a hydrocarbon solvent; or, conversely, titanium tetrachloride is added to said mixed solution of organoaluminum compound and ether compound.

(3) A mixed solution of an organoaluminum compound and an ether compound diluted with a hydrocarbon solvent is added to a mixture of titanium tetrachloride and an ether compound diluted with a hydrocarbon solvent; or, conversely, said mixed solution of titanium tetrachloride and an ether compound is added to said mixed solution of an organoaluminum compound and an ether compound diluted with a hydrocarbon solvent.

The reduction temperature is $-40°$ to $40°$ C., preferably $-20°$ to $30°$ C.

The hydrocarbon solvents used as a diluent in the reduction are aliphatic hydrocarbons, alicyclic hydrocarbons and aromatic hydrocarbon compounds. Examples include n-pentane, n-hexane, n-heptane, n-octane, n-decane, liquid paraffin, cyclohexane, methylcyclohexane, decalin, benzene, toluene and xylene. Of these solvents, aromatic hydrocarbons are preferred.

The procedure (II) for preparing the liquid ether complex of titanium trichloride is described below in detail.

The solid titanium trichloride for use as starting material can be any of those conventionally used as olefin polymerization catalyst components (so-called Ziegler-Natta catalysts). Examples of suitable titanium trichloride is that obtained by reducing titanium tetrachloride with hydrogen, metallic aluminum, metallic titanium or an organoaluminum compound; or titanium trichloride thus obtained and further activated by ball-milling, heat treatment or treatment with a complexing agent.

The amount of an ether compound used is 1 to 3 moles per 1 mole of titanium trichloride.

The temperature for the reaction of an ether compound with titanium trichloride is preferably $-20°$ to $40°$ C., more preferably $0°$ to $30°$ C. The hydrocarbon solvent used as the reaction medium may be the same as described in connection with the procedure (I).

According to this invention, the liquid ether complex of titanium trichloride is heated in the presence of the aforementioned carrier at a temperature of up to $150°$ C., preferably not lower than $25°$ C., more preferably $60°$ to $120°$ C., to deposit titanium trichloride and the resulting solid product is separated, washed with, for example, an inert hydrocarbon solvent and dried to obtain a titanium trichloride-containing solid product. The carrier can be added to the solution of an ether complex of titanium trichloride at any time before completion of the deposition of titanium trichloride, but preferably before the beginning of the deposition of titanium trichloride.

The amount of titanium trichloride to be deposited is not specifically limited, the range of molecular weight distribution of the polymer varies depending on the amount of deposited titanium trichloride. Therefore, to obtain a polymer having broad molecular weight distribution, the amount of trivalent titanium atoms contained in the solid product is preferably 3 to 20% by weight.

According to this invention, in order to obtain a polymer having sufficiently broad molecular weight distribution, the titanium trichloride-containing solid product thus obtained must be further reacted with titanium tetrachloride.

The reaction of the titanium trichloride-containing solid product with titanium tetrachloride can be carried out in the presence or absence of an inert hydrocarbon solvent as a diluent. A suitable reaction temperature is in the range of $20°$ to $150°$ C. The reaction time is not critical, but is advantageously selected from the range of 30 minutes to 3 hours. Te The reaction product is collected by filtration, washed thoroughly with a purified inert hydrocarbon solvent and used as such or after drying.

It is to be noted that, as will be shown later in the Example, a polymer having sufficiently broad molecular weight distribution is not obtained by using either (A) a titanium trichloride-containing solid product prepared by first reacting the carrier with titanium tetrachloride and then heating the resulting solid product in the presence of an ether complex of titanium trichloride at a temperature below $150°$ C. to deposit titanium trichloride or (B) a catalyst component prepared by further reacting said titanium trichloride-containing solid product with titanium tetrachloride. In order to obtain a polymer having sufficiently broad molecular weight distribution, it is important to use a solid catalyst component prepared by first contacting the carrier with an ether complex of titanium trichloride, heating at a temperature below $150°$ C. to deposit titanium trichloride and further reacting the resulting titanium trichloride-containing solid product with titanium tetrachloride.

The organoaluminum compounds represented by the general formula $R^2_p Y_q Al(OR^8)_r$ (wherein $R^2$ and $R^3$ represent a linear alkyl group, a branched chain alkyl group, an alicyclic hydrocarbon group, or an aromatic hydrocarbon group each having up to 8 carbon atoms, Y is a halogen or hydrogen, and p, q and r are numbers satisfying the following equations; $0 \leq p \leq 3$, $0 \leq q < 2$, $0 \leq r < 3$, and $p+q+r=3$), is used as an activating component together with the supported catalyst component in the olefin polymerization. Preferably, the organoaluminum compounds are those represented by the general formula $R^7_a AlY_{3-a}$ or mixed organoaluminum compounds of $R^7_a AlY_{3-a}$ and $R^8_b Al(OR^9)_{3-b}$ (wherein $R^7$, $R^8$ and $R^9$ represent each an alkyl group, an alicyclic hydrocarbon group or an aromatic hydrocarbon group each having up to 8 carbon atoms, Y represents a halogen or hydrogen, and a and b are numbers defined by $1 < a \leq 3$ and $0 \leq b < 3$, respectively). In order to produce a polymer having more sufficiently broad molecular weight distribution, it is preferable to mix the organoaluminum compound represented by the general formula $R^7_a AlY_{3-a}$ and the organoaluminum compound represented by the general formula $R^8_b Al(OR^9)_{3-b}$ in a molar ratio of 0.01-100, preferably 0.1-10.

Examples of these compounds are trialkylaluminums such as trimethylaluminum, triethylaluminum and triisobutylaluminum; alkylaluminum halides such as diethylaluminum chloride, di-n-butylaluminum chloride, ethylaluminum sesquichloride and ethylaluminum dichloride; and organoaluminum compounds represented by the general formula $R^8{}_b Al(OR^9)_{3-b}$ such as diethylaluminum methoxide, diethylaluminum ethoxide, diethyl-aluminum butoxide, diethylaluminum phenoxide and ethylaluminum diethoxide. Particularly preferred is a mixture of diethylaluminum chloride with diethylaluminum ethoxide, diethylaluminum methoxide or diethylaluminum phenoxide.

The molar ratio of organoaluminum compound as an activating agent to titanium atom contained in the solid catalyst component in the catalyst for olefin polymerization can be selected from a wide range of 0.1 to 500, preferably 0.5 to 200.

The polymerization can be carried out either continuously or batchwise. The polymerization type can be slurry polymerization in an inert hydrocarbon solvent, solution polymerization at high temperatures, or liquid phase or gaseous phase polymerization without using a solvent.

The olefins suitable for the polymerization according to this invention are those having 2 to 10 carbon atoms, examples of which include ethylene, propylene, butene-1, pentene-1, hexene-1, 3-methyl-pentene-1, and 4-methylpentene-1, but not limited thereto.

The polymerization process of this invention is applicable to either homo- or copolymerization. In copolymerization, a mixture of two or more olefins is contacted with the catalyst system of this invention to obtain a copolymer.

Monomers especially suitable for the polymerization are ethylene alone and mixtures of ethylene with other olefins (especially propylene, butene-1 and hexene-1).

A well-known molecular weight regulator such as, for example, hydrogen may be used in the polymerization.

The invention is illustrated below with reference to Examples, but not limited thereto. In Examples and Comparative Examples, MI represents melt index as measured according to ASTM D1288 at 190° C. at a load of 2.16 kg; MFR is the ratio of MI at a load of 21.6 kg to MI at a load of 2.16 kg (MFR=MI at 21.6/MI at 2.16) and serves as one of the measures for molecular weight distribution, a larger MFR value indicating broader molecular weight distribution.

EXAMPLE 1

(A) Synthesis of organomagnesium compound.

In a 500-ml flask provided with a stirrer, reflux condenser and dropping funnel, was placed 15.9 g (0.66 mole) of magnesium chips for Grignard reagent. While passing argon through the system, the flask was heated at 120° C. for 2 hours to expel completely the moisture remained on the internal wall of the flask and on the surface of magnesium chips. From the dropping funnel containing a mixture of 69 ml (0.66 mole) of n-butyl chloride and 280 ml of n-butyl ether, about 30 ml of the mixture was added dropwise onto the magnesium chips to initiate the reaction. Thereafter, while maintaining the temperature of the system at 60° C., dropwise addition of the mixture was continued so that the reaction may proceed quietly. After completion of the addition, the reaction was continued at 60° C. for further one hour. The reaction mixture was then cooled to room temperature. The organomagnesium compound content of the n-butyl ether was 2.0 moles/liter.

(B) Preparation of carrier.

A 200-ml flask provided with a stirrer and dropping funnel was flushed with argon. Into the flask, was charged 80 mmoles (40 ml of the ether solution) of n-butylmagnesium chloride synthesized in (A). From the dropping funnel 8.9 ml of silicon tetrachloride was slowly added dropwise to the n-butylmagnesium chloride to form a white precipitate. Then, the reaction was continued for one hour at 50° C., and for additional one hour at 60° C. After the reaction, the white precipitate was separated, washed with n-heptane and dried under a reduced pressure to obtain 10.7 g of a white solid. The white solid contained 28% by weight of n-butyl ether.

(C) Preparation of titanium trichloride-containing solid product.

A 100-ml flask provided with a stirrer and dropping funnel was flushed with argon. Into the flask, were charged 40 ml of toluene, 1.7 ml (13.6 mmoles) of diethylaluminum chloride and 4.6 ml (27.2 mmoles) of n-butyl ether. From the dropping funnel containing a solution of 3.0 ml (27.2 mmoles) of titanium tetrachloride in 6 ml of toluene, the solution was slowly added to the flask containing diethylaluminum chloride and di-n-butyl ether in toluene, while maintaining the temperature at −10° C. After completion of the addition, the mixture was allowed to react for further 30 minutes at room temperature to obtain a solution of ether complex of titanium trichloride. To the resulting solution, was added 7.0 g of the carrier prepared in (B) above. The mixture was thoroughly stirred for 30 minutes at room temperature, then heated at 50° C. for 30 minutes and at 100° C. for one hour to effect deposition of titanium trichloride. The solid was separated, washed and dried under a reduced pressure to obtain 11 g of a titanium trichloride-containing solid product containing 12.5% by weight of trivalent titanium atoms and 16.8% by weight of n-butyl ether.

(D) Preparation of supported catalyst component.

A 100-ml flask provided with a stirrer was flushed with argon. Into the flask, were charged 10 g of the titanium trichloride-containing solid product prepared in (C) above and 50 ml of titanium tetrachloride. The mixture was allowed to react at 100° C. for one hour. After completion of the reaction, the solid product was washed repeatedly with n-heptane until no more titanium tetrachloride had been detected in the washings, and dried under a reduced pressure to obtain 9 g of a solid catalyst component which was found on analysis to contain 140 mg of titanium atoms per 1 g of solid catalyst component and no n-butyl ether.

(E) Polymerization.

Into a 1-liter stainless steel autoclave equipped with an electromagnetic induction stirrer, which had been thoroughly flushed with nitrogen and maintained at 70° C., were charged with stirring 500 ml of n-heptane, which had been thoroughly dehydrated and deoxygenated, 1.25 mmoles of ethylaluminum diethoxide, 1.25 mmoles of diethylaluminum chloride, and 16.1 mg of the solid catalyst component prepared in (D) above. To the autoclave, were added hydrogen until the gage pressure had become 10 kg/cm², followed by ethylene until the gage pressure had reached 20 kg/cm$^2$. After the polymerization had begun, the total pressure was maintained at 20 kg/cm$^2$ by replenishing with ethylene to allow the polymerization to continue at 70° C. for one hour. After completion of the polymerization, the polymerizate was collected by filtration, washed with n-heptane, and dried under a reduced pressure at 60° C. to obtain 35 g of polyethylene which showed a MI of 0.059 and a MFR of 105. The product in powder form showed excellent powder characteristics, the bulk density having been 0.31 and the particle size uniform. The catalyst activity was 2,170 g polyethylene per g solid catalyst component per hour or 15,500 g polyethylene per g titanium per hour.

COMPARATIVE EXAMPLE 1

Into a 100-flask provided with a stirrer, which had been flushed with argon, were charged 10 g of the carrier prepared in the same manner as in Example 1 and 50 ml of titanium tetrachloride. The mixture was allowed to react at 100° C. for one hour. After completion of the reaction, the reaction product was washed repeatedly with n-heptane until no more titanium tetrachloride had been detected in the washings, and dried under a reduced pressure to obtain a solid catalyst which was found, on analysis, to contain 28 mg of titanium atoms per one g of the solid catalyst component.

By using 15.7 mg of the solid catalyst obtained above, polymerization was carried out under the same conditions as in Example 1, except that the ethylene partial pressure was 10 kg/cm$^2$ and the hydrogen partial pressure was 5 kg/cm$^2$. There were obtained 30 g of polyethylene having a MI of 0.14 and a MFR of as small as 34.0. The catalyst activity was 1,910 g polyethylene/g solid catalyst/hour or 67,900 g polyethylene/g titanium/hour.

COMPARATIVE EXAMPLE 2

By using 17.7 mg of the titanium trichloride-containing solid catalyst prepared in Example 1 (C), polymerization was conducted under the same conditions as in Example 1. There were obtained 34 g of polyethylene having a MI of 0.18 and a MFR of 51.2 which was smaller than the value obtained in Example 1. The catalyst activity was 1,920 g polyethylene/g solid catalyst/hour or 15,300 g polyethylene/g titanium/hour.

EXAMPLE 2

(A) Preparation of titanium trichloride.

Into a 1-liter flask which had been flushed with argon, were introduced 200 ml of dry hexane and 50 ml of titanium tetrachloride. To the resulting solution which was kept at −5° C., was added dropwise a solution containing 116 ml of ethylaluminum sesquichloride in 150 ml of dry hexane so that the temperature of the reaction system may be kept below −3° C. The mixture was kept stirred at the same temperature for 2 hours. The reaction temperature was then elevated to 50° C. and the reaction was continued for additional 2 hours at this temperature. After completion of the reaction, the reaction product was separated, washed and dried under a reduced pressure to obtain 80 g of titanium trichloride.

(B) Preparation of titanium trichloride-containing solid product.

Into a 100-ml flask which had been flushed with argon, were charged 20 ml of dry toluene, 3.7 g of titanium trichloride prepared in (A) above, and 4.1 ml of n-butyl ether. The mixture was stirred at room temperature for 30 minutes to form liquid ether complex of titanium trichloride. To the resulting solution, was added 3.8 g of a carrier prepared under the same conditions as in Example 1. The mixture was stirred at room temperature for 30 minutes, then heated at 50° C. for 30 minutes and at 100° C. for one hour to effect the deposition treatment. The product was separated, washed with n-heptane and dried under a reduced pressure to obtain 5.2 g of a titanium trichloride-containing solid product which contained 11.0% by weight of trivalent titanium atoms.

(C) Preparation of supported catalyst component.

Under the same conditions as in Example 1 (D), the reaction of the titanium trichloride-containing solid product obtained above with titanium tetrachloride was conducted to prepare a solid catalyst.

A polymerization of ethylene was run by using 17.6 mg of the above solid catalyst under the same conditions as in Example 1 to obtain 43.4 g of polyethylene having a MI of 0.067 and a MFR of as large as 126. This powdered polyethylene showed excellent powder characteristics, the bulk density having been 0.32 and the particle size uniform. The catalyst activity was 2,470 g polyethylene/g solid catalyst/hour or 19,700 g polyethylene/g titanium/hour.

EXAMPLES 3, 4 AND 5

Supported catalysts were prepared under the same conditions as in Example 2, except that the amounts used of the titanium trichloride prepared in Example 2 (A) and the n-butyl ether were varied. Polymerization of ethylene was conducted under the same conditions as in Example 1. As shown in Table 1, excellent results were obtained in every cases.

TABLE 1

| | Preparation of catalyst | Preparation of catalyst and results of polymerization. | | | | | | |
|---|---|---|---|---|---|---|---|---|
| | | Conditions and results of polymerization | | | | | | |
| Example No. | Amount of supported trivalent Ti (wt.-%) | Amount used of catalyst (mg) | Organoaluminum compound | Yield (g) | g PE/g solid catalyst component/hour | MI | MFR | Bulk density |
| 3 | 2.9 | 19.2 | Et$_{1.5}$Al(OEt)$_{1.0}$Cl$_{0.5}$ | 40 | 2070 | 0.19 | 74.7 | 0.30 |
| 4 | 6.7 | 18.5 | " | 46 | 2510 | 0.086 | 107 | 0.31 |

TABLE 1-continued

| | Preparation of catalyst and results of polymerization. | | | | | | | |
|---|---|---|---|---|---|---|---|---|
| | Preparation of catalyst | Conditions and results of polymerization | | | | | | |
| Example No. | Amount of supported trivalent Ti (wt.-%) | Amount used of catalyst (mg) | Organoaluminum compound | Yield (g) | g PE/g solid cata- lyst com- ponent/hour | MI | MFR | Bulk den- sity |
| 5 | 16.8 | 16.9 | " | 43 | 2570 | 0.054 | 68.6 | 0.31 |

Note:
1. Polymerization conditions: the same as in Example 1 [Et$_{1.5}$Al(OEt)$_{1.0}$Cl$_{0.5}$: 2.5 mmoles; hydrogen: 10 kg/cm$^2$; ethylene: 10 kg/cm$^2$; 70° C., 1 hour].
2. Catalysts were prepared in a manner similar to that in Example 2.
3. Et and OEt represent ethyl group and ethoxide group, respectively.

EXAMPLES 6 TO 11

Polymerization of ethylene was conducted by use of the supported catalyst prepared in Example 2 in combination with various types of organoaluminum compounds. The polymerization conditions were the same as in Example 1, except that different types of organoaluminum compounds were used and the hydrogen partial pressure was 5 kg/cm$^2$. The types of organoaluminum compounds and the results of polymerization were as shown in Table 2.

prepared in Example 2 (A), 20 ml of dry toluene, and 2.9 ml of n-butyl ether. The mixture was stirred at room temperature for 30 minutes to form liquid titanium trichloride-ether complex. To the resulting solution, was added 3.4 g of the solid catalyst prepared in Comparative Example 1. The mixture was stirred at room temperature for 30 minutes, then heated at 50° C. for 30 minutes and at 100° C. for 1 hour to effect the deposition treatment. The product was separated, washed with n-heptane and dried under a reduced pressure to obtain a titanium trichloride-containing solid product contain-

TABLE 2

| | Types of organoaluminum compounds and results of polymerization. | | | | | |
|---|---|---|---|---|---|---|
| Example No. | Amount used of catalyst (mg) | Organoaluminum compound | Yield (g) | g Polyethylene/g solid catalyst component/hour | MI | MFR |
| 6 | 7.0 | Et$_3$Al | 36 | 5100 | 0.20 | 54.8 |
| 7 | 6.8 | Et$_{2.5}$AlCl$_{0.5}$ | 34 | 5020 | 0.18 | 60.2 |
| 8 | 12.6 | Et$_{2.25}$Al(OEt)$_{0.25}$Cl$_{0.5}$ | 41 | 3220 | 0.14 | 87.3 |
| 9 | 17.4 | Et$_{2.0}$Al(OEt)$_{0.5}$Cl$_{0.5}$ | 48 | 2770 | 0.088 | 110 |
| 10 | 13.1 | Et$_{2.25}$Al(OMe)$_{0.25}$Cl$_{0.5}$ | 45 | 3440 | 0.16 | 80.4 |
| 11 | 14.3 | Et$_{2.25}$Al(OPh)$_{0.25}$Cl$_{0.5}$ | 43 | 3010 | 0.21 | 77.6 |

Note:
1. Polymerization conditions: organoaluminum compound, 2.5 mmoles; hydrogen, 5 kg/cm$^2$; ethylene, 10 kg/cm$^2$; 70° C. for 1 hour.
2. Et, OEt, OMe, and OPh represent ethyl group, ethoxide group, methoxide group and phenoxide group, respectively.

COMPARATIVE EXAMPLE 3

Polymerization of ethylene was conducted under the same conditions as in Comparative Example 1, except that 7.5 mg of the solid catalyst component prepared in Comparative Example 1 was used and 2.5 mmoles of triethyaluminum was used as the organoaluminum compound. There were obtained 34 g of polyethylene having a MI of 0.29 and a MFR of as small as 33. The catalyst activity was 4,570 g polyethylene/g solid catalyst/hour.

COMPARATIVE EXAMPLE 4

Polymerization of ethylene was conducted under the same conditions as in Comparative Example 3, except that 8.2 mg of the titanium trichloride-containing solid product prepared in Example 1 (C) was used in combination with 2.5 mmoles of triethylaluminum as the organoaluminum compound in polymerization. There were obtained 39 g of polyethylene having a MI of 0.13 and a MFR of as small as 45.1. The catalyst activity was 4,760 g polyethylene/g solid catalyst/hour.

COMPARATIVE EXAMPLE 5

Into a 100-ml flask which had been flushed with argon, were charged 2.6 g of the titanium trichloride ing 9.7% by weight of trivalent titanium atoms.

Using 19.3 mg of the above solid catalyst, ethylene was polymerized under the same conditions as in Example 1. There were obtained 29 g of polyethylene having a MI of 0.20 and a small MFR of 50. The catalyst activity was 1,500 g polyethylene/g solid catalyst/hour.

COMPARATIVE EXAMPLE 6

The titanium trichloride-containing solid product prepared in Comparative Example 5 was reacted with titanium tetrachloride under the same conditions as in Example 1 (D) to obtain a solid catalyst. Ethylene was polymerized by use of 18.7 mg of the above solid catalyst under the same conditions as in Example 1 to obtain 32 g of polyethylene having a MI of 0.17 and a small MFR of 56.5. The catalyst activity was 1,710 g polyethylene/g solid catalyst/hour.

COMPARATIVE EXAMPLE 7

Into a 100-ml flask which had been flushed with argon, were charged 5 g of the solid catalyst prepared in Comparative Example 1, 100 ml of dry heptane, and 12.6 ml of diethylaluminum chloride. The mixture was allowed to react at 50° C. for 2 hours. After completion of the reaction, the product was washed with n-heptane and dried to obtain a brown titanium trichloride-containing solid product. A mixture of 5 g of the above solid product and 50 ml of titanium tetrachloride was allowed to react at 130° C. for 2 hours. After completion of the reaction, the product was washed with n-heptane and dried to obtain a purple solid catalyst.

Ethylene was polymerized by using 15.5 mg of the above solid catalyst under the same conditions as in Example 1 to obtain 31 g of polyethylene having a MI of 0.22 and a small MFR of 31.2. The catalyst activity was 2,000 g polyethylene/g solid catalyst/hour.

As is apparent from Comparative Examples 5, 6 and 7, in order to prepare a polymer having a broad molecular weight distribution, it is important that as in case of this invention, at first the carrier is contacted with a liquid ether complex of titanium trichloride to form a titanium trichloride-containing solid product which is further reacted with titanium tetrachloride.

EXAMPLE 12

Polymerization of ethylene was carried out under the same conditions as in Example 1, except that 15.6 mg of the solid catalyst component prepared in Example 1 (D) and 2.5 mmoles of $(C_2H_5)_{2.1}AlCl_{0.9}$ as an activating agent were used and 7 g of butene-1 was introduced into the autoclave prior to the introduction of ethylene. There were obtained 39 g of a polymer having a MI of 0.11 and a MFR of 87. This polymer in powder form showed excellent powder characteristics, the bulk density having been 0.36 and the particle size having been uniform. The catalyst activity was 2,500 g polymer/g solid catalyst/hour.

The above polymer had a density of 0.9420 and a methyl group content of 5.6 per 1,000 carbon atoms, as determined by infrared absorption spectroscopy, confirming that the polymer was an ethylene-butene-1 copolymer.

EXAMPLE 13

In a 200-ml flask provided with a stirrer and a dropping funnel, which has been flushed with argon, 10.7 g of sublimated anhydrous aluminum chloride was dissolved in 30 ml of n-butyl ether. From the dropping funnel, 80 mmoles (40 ml of ether solution) of n-butyl-magnesium chloride synthesized in Example 1 (A) was slowly added dropwise to the solution in the flask to form a white precipitate. After one hour of the reaction at 50° C., the precipitate was separated, washed with n-heptane and dried under a reduced pressure to obtain a white solid. By using the solid as carrier, a supported catalyst containing 12.8% by weight of trivalent titanium atoms was prepared in a manner similar to that in Example 1. Ethylene was polymerized with 16.8 mg of the solid catalyst under the same conditions as in Example 1 to obtain 33 g of polyethylene having a MI of 0.063, a MFR of as large as 98, and a bulk density of 0.24. The catalyst activity was 1,960 g polyethylene/g solid catalyst/hour.

EXAMPLE 14

Into a 100-ml flask, which had been flushed with argon, were added 1.1 g of titanium trichloride prepared in Example 2 (A), 30 ml of toluene, and 1.2 ml of n-butyl ether. The mixture was stirred at room temperature for 30 minutes to prepare a solution of liquid ether complex of titanium trichloride. To the solution, was added 8.3 g of a carrier prepared under the same conditions as in Example 1. The mixture was stirred at room temperature for 30 minutes, then heated at 50° C. for 30 minutes and at 100° C. for one hour to effect deposition treatment. The product was separated, washed with n-heptane and dried under a reduced pressure to obtain a titanium trichloride-containing solid product containing 2.8% by weight of trivalent titanium atoms.

Into a flask, were charged 3.0 g of the titanium trichloride-containing solid product obtained above and 30 ml of titanium tetrachloride. The mixture was allowed to react at 130° C. for 2 hours. After completion of the reaction, the product was separated, washed with n-heptane and dried under a reduced pressure to obtain 2.6 g of a supported catalyst which was found, on analysis, to contain 43 mg of titanium atoms per g of the solid catalyst.

Ethylene was polymerized by using 15.6 mg of the above supported catalyst under the same conditions as in Example 1 to obtain 52 g of polyethylene having a MI of 0.12 and a MFR of 130. This polyethylene in powder form showed excellent powder characteristics, the bulk density having been 0.31 and the particle size uniform. The catalyst activity was 3,330 g polyethylene/g solid catalyst/hour or 77,400 g polyethylene/g titanium/hour.

What is claimed is:

1. A supported catalyst component prepared by a process comprising
   (1) forming a solid product carrier in an inert atmosphere by
      (I) reacting (a) an organomagnesium compound of the formulae $R^6MgX$ or $R^6{}_2Mg$ wherein $R^6$ is an alkyl group, an aryl group, an aralkyl group, or an alkenyl group each having up to 8 carbon atoms and X is a halogen atom with (b) (i) an aluminum halide compound of the formula $R_nAlX_{3-n}$ wherein R is an alkyl group, an aryl group, an aralkyl group, or an alkenyl group each having up to 8 carbon atoms, X is a halogen atom, and n is a number defined by $0 \leq n < 3$ and/or (ii) a silicon halide compound of the formula $R^1{}_mSiX_{4-m}$ wherein $R^1$ is an alkyl group, an aryl group, an aralkyl group, or an alkenyl group each having up to 8 carbon atoms, X is a halogen atom, and m is a number defined by $0 \leq m < 4$ in a hydrocarbon solvent and/or an etherial solvent at a temperature of 0° to 100° C., in a former-to-latter molar ratio of 1:10 to 10:1 to form a solid product,
      (II) separating the resulting solid product from the reaction system and
      (III) washing the solid product with a hydrocarbon solvent to form a solid product carrier,
   (2)
      (I) heating a liquid ether complex of titanium trichloride in a hydrocarbon solvent at a temperature of about 25° to about 150° C. in the presence of said carrier to deposit titanium trichloride on the carrier, the amount of trivalent titanium atoms contained in the solid product being 3 to 20% by weight,
      (II) separating the resulting titanium trichloride-containing solid product form the reaction system, and
      (III) washing the solid product with a hydrocarbon solvent, and
   (3)

(I) further reacting the titanium trichloride-containing solid product obtained above with titanium tetrachloride at a temperature of about 20° to 150° C., (II) separating the resulting supported catalyst component from the reaction system, and (III) washing the supported catalyst component with a hydrocarbon solvent.

2. The supported catalyst component of claim 1, wherein a liquid ether complex of titanium trichloride is obtained by (I) reducing titanium tetrachloride with an organoaluminum compound in the presence of an ether compound at a temperature of −40° to 40° C., or (II) converting solid titanium trichloride into a soluble ether complex by contacting said solid titanium trichloride with an ether compound in a hydrocarbon solvent at a temperature of about −20° C. to about 40° C.

3. The supported catalyst component of claim 2, wherein said ether compound is of the formula $R^4OR^5$ wherein $R^4$ and $R^5$, which may be the same or different, each represent an alkyl group having 2 to 5 carbon atoms.

4. The supported catalyst component of claim 2, wherein the amount of said ether compound to be used is 0.1 to 3 moles per 1 mole of titanium tetrachloride or titanium trichloride.

5. The supported catalyst component of claim 3 wherein said ether compound is di-n-butyl ether.

6. The supported catalyst component of claim 1, wherein said aluminum halide compound is an anhydrous aluminum halide, alkylaluminum dichloride, dialkylaluminum halide, or alkylaluminum sesquihalide.

7. The supported catalyst component of claim 6, wherein said aluminum halide compound is anhydrous aluminum chloride, ethylaluminum dichloride, diethylaluminum chloride, or ethylaluminum sesquichloride.

8. The supported catalyst component of claim 1, wherein said silicon halide compound is silicon tetrachloride.

9. The supported catalyst component of claim 1, wherein said etherial solvent is of the formula $R^4OR^5$ wherein $R^4$ and $R^5$, which may be the same or different, each represent an alkyl group having 2 to 5 carbon atoms.

10. A catalyst for the polymerization of an olefin, which comprises (A) a supported catalyst component of any one of claims 1 to 9 and (B) an organoaluminum compound of the formula $R^2_p Y_q Al (OR^3)_r$, wherein $R^2$ and $R^3$ each represent a linear alkyl group, a branched chain alkyl group, or an alicyclic hydrocarbon group, each having up to 8 carbon atoms, or an aromatic hydrocarbon group, Y is a halogen atom or hydrogen atom, and p, q and r are numbers satisfying the following equations; $0 \leq p \leq 3$, $0 \leq q < 2$, $0 \leq r < 3$, and $p+q+r=3$, as an activating component.

11. The catalyst of claim 10, wherein said organoaluminum compound is a compound of the formula $R^7_a AlY_{3-a}$ or a mixture of a compound represented by $R^7_a AlY_{3-a}$ and a compound of the formula $R^8_b Al(OR^9)_{3-b}$, wherein $R^7$, $R^8$ and $R^9$ each represent an alkyl group or an alicyclic hydrocarbon group, each having up to 8 carbon atoms, or an aromatic hydrocarbon group, Y is a halogen atom or hydrogen atom, and a and b are number defined by $1 < a \leq 3$ and $0 \leq b < 3$, respectively.

12. The catalyst of claim 11, wherein said organoaluminum compound is a mixture of a compound of the formula $R^7_a AlY_{3-a}$ and a compound of the formula $R^8_b Al(OR^9)_{3-b}$, which compounds are present in a molar ratio of 0.1 to 10.

* * * * *